Aug. 14, 1951

H. W. LINDSAY 2,563,850

MAGNETIC TAPE RECORDER

Filed July 5, 1950

INVENTOR.
HAROLD W. LINDSAY
BY
Lippincott & Smith,
ATTORNEYS

Patented Aug. 14, 1951

2,563,850

UNITED STATES PATENT OFFICE 2,563,850

MAGNETIC TAPE RECORDER

Harold W. Lindsay, Redwood City, Calif., assignor to Ampex Electric Corporation, San Carlos, Calif., a corporation of California Application July 5, 1950, Serial No. 172,133

16 Claims. (Cl. 179—100.2)

This invention relates to a quick-loading magnetic head assembly which is particularly adaptable for use in recording and reproducing signals from magnetic tapes, as well as for wiping the signal from the tape.

In copending U. S. patent application Serial No. 82,695, entitled "Recording Head Assembly," filed March 21, 1949, now Patent No. 2,551,845, by this applicant, there is disclosed a form of magnetic head assembly which is also of the quick-loading variety. As in the named copending application, this present invention operates to position and locate a flexible magnetic tape in an operating state relative to one or more magnetic heads. The flexible magnetic tape is of a width of the order of a quarter-inch and a thickness of the order of one-, two-, or three-thousandths of an inch. In the operation of the invention the magnetic tape is first positioned adjacent the various magnetic heads and then by suitable tape-moving mechanisms drawn across the heads. The magnetic heads in a complete assembly are usually for the purpose of pre-conditioning the tape by wiping off or erasing any previously recorded messages, then recording a new message, and, lastly, reproducing the newly recorded last message.

The type magnetic tape used for the described purpose is usually formed of plastic or paper. It may be a cellulose or a cellulose-acetate, with one side thereof coated with a ferrous substance, such as iron-oxide. In the operation of such an assembly of magnetic heads with the tape, the tape is generally stored upon a suitable supply reel, from which it is unwound for utilization purposes. The tape, as it is unwound from the supply reel for use, is usually passed over a suitable idler and then drawn through the magnetic head assembly. In the head assembly contact is made with the various heads, as will be explained. As the tape leaves the magnetic head assembly it is passed over a suitable driving capstan and thence to suitable tensioning rollers from which it is fed to a suitable take-up spool or reel for storage.

The invention herein to be described is primarily directed to ways and means for quickly threading the magnetic tape into the magnetic head assembly so that the tape so loaded may be almost instantly positioned in optimum operating position relative to the various therein-contained magnetic heads. The copending application above mentioned has set forth one form of mechanism for accomplishing some of the objectives of this present invention. The present invention, however, provides arrangements whereby the flexible magnetic tape may be positioned upon suitable support elements relative to the magnetic heads and then, upon closure of the support elements relative to the magnetic head, the magnetic tape is automatically released from the support and positively positioned and supported relative to one of the several magnetic heads for utilization purposes.

The magnetic heads upon which the magnetic tape is operatively positioned are formed with magnetic cores with a gap between the core sections. This gap is generally of a size which is a function of the type of use to which the particular magnetic head is to be placed. Generally speaking, since high frequencies are utilized in an erasing or wiping operation, the wiping or erasing types of magnetic heads have greater spacing between the cores than is desirable for the reproducing heads. The gap between the cores of the recording head is usually of an intermediate spacing. The gap space between the cores is filled with various non-magnetic types of material, such as a beryllium-copper mixture or any other suitable alloy. In operation the magnetic tape is drawn across the heads to contact them over an arc which is bisected by the spacing members.

To thread a magnetic tape according to this invention the tape is ordinarily placed upon a plurality of tape supporting and positioning elements in the loading position. Those supporting and positioning elements are then later displaced in such a way as to move the tape closely over the magnetic heads and in an operating position relative thereto. In using this type of apparatus it is usually desirable for various reasons to have the tape and the magnetic heads contact each other over a rather reduced arc. Various arcs of contact have been tried in the past but experience has established that an arc of contact of the order of 8° is about the minimum that can be utilized satisfactorily in practice. It is important that in the operation of the invention the tape positioning mechanism shall operate so as to thread or position the magnetic tape with respect to the magnetic heads in such a manner that the angle of contact established shall be of the general order of the minimum arc hereinabove suggested.

The magnetic heads with which this invention is concerned are positioned adjacent one another but along an arcuate path within a suitable housing element. Each individual magnetic head is additionally appropriately located within its own suitable shield housing. The separate shielding housings are so located relative to one another that, while they are adjacent each other within the main housing, they are nonetheless positioned in such a manner that the magnetic head therein contained will have its surface arranged to contact the magnetic tape in its loaded position over the desired angle of arc.

According to one preferred form of mechanism by which the present invention is practiced, there is attached at the plane of the base of the housing a suitable housing cover which is arranged to rotate in any suitable manner to serve in its open position as the guiding means for locating the tape and in its closed position to place the tape in the desired location relative to the magnetic heads for utilization. To this end there is fastened or secured, for instance, to the cover of the housing, a suitably curved or arced tape support plate. The magnetic tape is rested or supported upon this curved plate in the cover-open position. Simultaneously, the tape is supported intermediate the curved or arced plates and caused to rest against a pair of anti-friction bearing surfaces. The elements so position the tape that it is carried in its flattened or transverse position to a state adjacent the magnetic head elements with cover closure.

As the tape is so supported and rested upon the curved or arcuate tape positioning elements and the intermediate supports, it is held in a position which is substantially that distance from the base of the housing which corresponds to the elevation of the several magnetic heads. Upon cover-closure the arced tape support plate, which pivots or turns with the housing cover rotating about the hinge axis with cover closure is moved to a position from which it releases the tape to a utilization position.

To permit this type of tape location the housing is preferably provided at either end thereof with tape-passing slots or openings. These slots or openings have suitable bearing surfaces positioned adjacent thereto and defining the opening width. The bearing surfaces are usually provided in the form of suitable anti-friction elements, such as glass or quartz rods or members. The bearing surfaces are held in suitable brackets which are appropriately located and positioned relative to the tape ingress and egress slots or openings of the housing proper and which provide the precise separation relative to one another which coincides with the tape width. Thus, by providing one fixed edge of the bearing surface and arranging the support rod or bearing so as to be movable substantially within this member it is possible to resort to less precisely machined bearing surfaces and still have the tape appropriately positioned and located by the support or bearing surface.

Each of the magnetic heads in the assembly is suitably positioned and housed within an appropriate shield can, as above noted. It is desirable usually that the reproducing head be most carefully shielded. Only relatively minor amounts of shielding are required for the erasure head. While the recording head need not be as completely shielded as the reproducing head, it nonetheless is desirable that the recording head be substantially fully housed.

When the tape supporting cover element is in its open position so that the tape rests upon the tape supports and the anti-friction bearing surfaces, it can be moved free from contact with the magnetic heads. Rapid tape movement operations through the housing are performed with the tape so held. This is usually for rewind, although in some instances it may be where it is desired to start tape use at an intermediate point. Upon cover closure, however, the bearing surfaces are caused to move inwardly and between the various shield elements for the magnetic head in such a way as to free the tape from contact therewith and to permit the tape so supported immediately to move over to a position adjacent the magnetic heads in order to establish the desired arcuate contact.

Since the shields surrounding the magnetic heads are in some instances provided with cover portions or, since the shields substantially surround the magnetic heads in cases where covers are not provided, it is usually desirable to provide some appropriate form of tape ingress and egress slots or openings therein. To this end the main shield may be recessed sufficiently for the purpose of the tape passage or the combination of the shield and its cover may be recessed or apertured to the extent necessary to provide tape passage, or the cover only, for instance, may be recessed or apertured depending upon the precise construction utilized and the amount of overlap of the recording head provided by the cover. In any event, in cases where the magnetic head shield extends outwardly for the distance corresponding precisely to the extent of outward extension of the magnetic head provision is made whereby the tape itself may be passed freely through the shielding mechanism so that its contact is solely upon the magnetic heads themselves and tape edge bearing surfaces at the outer edges of the main housing.

One of the main objects of the invention generally outlined above is to provide a tape-holding device from which a magnetic tape may be quickly and accurately discharged to be loaded and positioned for use with respect to one or a plurality of magnetic heads serving any desired purpose, such as recording, reproducing or erasing.

Another object of the invention is that of providing a magnetic head assembly of the quick-loading variety wherein the tape may be positioned in such a manner that it automatically comes to rest in fitted position in precisely the location whereupon it is to be utilized.

Still another object of the invention is to arrange and locate the suitable magnetic heads relative to one another in the complete assembly in such fashion that a magnetic tape may be quickly loaded thereupon and so positioned as to establish a desired degree of arcuate contact therewith in order that the various operations may be maintained. It is important in this connection to note that rapidity of loading and tape positioning is often very vital to a satisfactory operation of any reproducing or recording equipment.

Another object of the invention is to provide a magnetic head assembly and housing unit which will so support a tape that the tape can rapidly be loaded and then later the same components used to position the tape adjacent the magnetic heads will remove the tape therefrom and so support it that it can be rapidly drawn through the housing itself in a position clear from the recording heads for a rewind operation. Accordingly, the invention provides a means to load a tape on any or all of a plurality of magnetic recording, reproducing and erasing head elements so that the tape can be drawn through the housing at the desired rate of the feed in precise contact with the various heads and yet upon removing the tape from the heads it can be drawn through the housing at much higher speeds.

Other and further objects of the invention will, of course, suggest themselves and at once come to mind of those skilled in the art to which the invention is directed when the following description is read in conjunction with the accompanying drawings wherein.

Figures 1, 2, 3, 4:
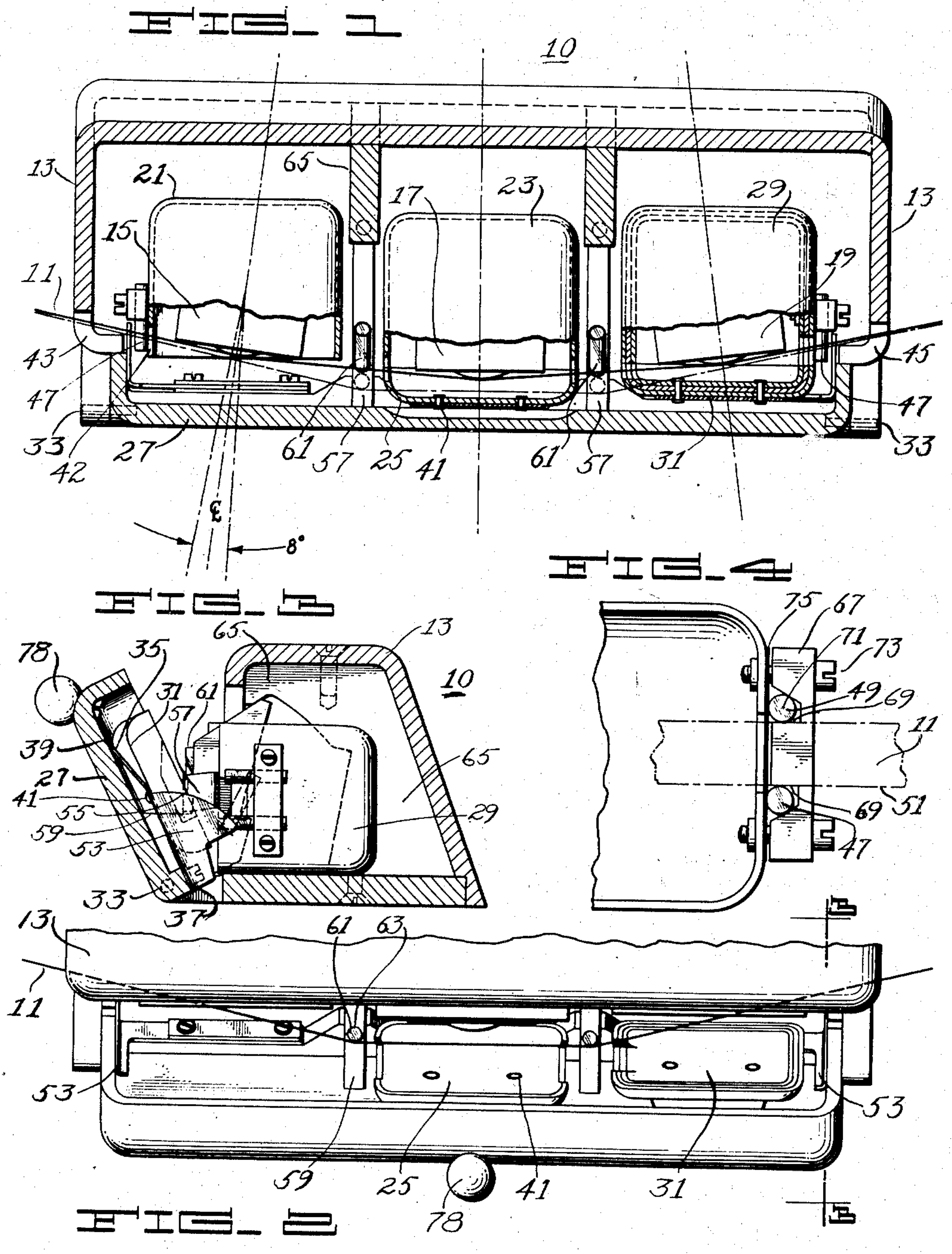
Fig. 1 represents a section through a recording head assembly showing the recording tape positioned in arcuate contact with respect to a plurality of magnetic heads.
Fig. 2 is a plan view of a magnetic head assembly of Fig. 1 with the loading mechanism shown in cover-open position so as to provide for tape loading or tape rewind.

Fig. 3 is a section through the assembly of Fig. 2 taken along the dot-dash line 3—3, for the purpose of showing more particularly the tape locating and loading mechanism; and, Fig. 4 is a plan view looking down upon a portion of one of the magnetic head shielding units for the purpose of showing more particularly the bearing surface arrangement through which the tape is moved into and out of the housing proper.

Referring now to the drawings for a further understanding of the invention, the tape strip 11 which, as above stated, is flexible or elastic and preferably formed of paper or plastic coated on one side with the iron-oxide or its equivalent, is fed from a spool or pay-off reel (not shown) over a suitable idler (not shown) referred to in the copending application above named (Serial No. 82,695). From such an idler the tape is directed through the magnetic head assembly, generally shown at 10. Upon leaving the assembly 10 the tape is passed over a suitable form of idler and driving mechanism and after passing over a suitable tensioning arm it feeds on to a suitable take-up reel or spool (likewise not shown). The driving means (not shown) may, by way of example, be of any suitable form and variety. One suitable form of such mechanism is that disclosed and claimed in the copending United States patent application of this applicant, Serial No. 82,692, entitled "Alining Mechanism for Tape Recordings," filed March 21, 1949.

For the purpose of the present invention it is unnecessary to describe in detail the method by which the tape is drawn through the magnetic head assembly. Therefore, suffice it to say that the tape is usually drawn by a driving capstan which is, in turn, controlled or driven by a synchronous motor. With such apparatus appropriately functioning the tape is moved in the direction shown by the arrow, particularly on Figs. 1 and 2, so as to pass first in the illustrated example, across the magnetic erasure head, thence the magnetic recording head, and thence the magnetic reproducing head for the record position. When the tape is moved in the reverse direction, as it can be moved with the cover in its open position of Fig. 2, later to be explained, it, of course, so moves as to feed from what is normally the take-up reel back on to the supply reel. In this state the tape motion is usually rapid relative to that of the normal operating or record position. Various means of providing rapid tape rewind are known. One suitable form is described in the copending United States patent application of this applicant, Serial No. 93,548, entitled "Message Selector for Magnetic Reproducers," filed May 12, 1949.

The magnetic tape for utilization is passed through a suitable housing 13 wherein is contained the plurality of magnetic heads. These heads are generally designated as 15 for wiping or erasing signals from the tape, 17 for recording signals upon the tape, and 19 for reproducing those signals which have been recorded. As already stated, the magnetic heads are formed preferably of magnetic cores between which there is a gap and which gap is filled with a suitable non-magnetic material. The core may be an alloy of selected metals such as nickel and iron. As is particularly illustrated by Fig. 1 the tape 11 as it is positioned and moved relative to any of the magnetic heads 15, 17 and 19, makes contact with the magnetic head portion over a limited arcuate path. In the illustrated example this has been shown as an arc of 8°, representing 4° on either side of the center line of tangential contact, since the magnetic head is usually generally curved in its tape contacting face. This angle or arc of contact is set forth merely illustratively but represents generally one arc of contact which has been shown to be satisfactory with the described apparatus, although it has been found to represent generally about the minimum arc that is satisfactorily usable.

Each of the magnetic heads is contained within a suitable shield element. Since the magnetic wiping or erasing head 15 usually has high frequency applied thereto for wiping or erasing any recordings from the tape 11, its shielding need not be as complete as for the recording and reproducing heads 17 and 19. Accordingly, the shield can shown at 21, for instance, is arranged to surround and substantially house the magnetic head, although it does not cover that portion of the head which will face toward the housing cover upon cover closure.

The recording head 17 is placed within a shield shown generally at 23. This shield comprises a suitable shielding element upon which there is preferably fitted for operation a cover portion 25 which is carried within or upon the inner surface of the main housing cover, generally represented at 27. The magnetic reproducing head 19 is generally the most carefully shielded of the group. It is contained within a housing or shield element 29. Similarly, it is provided with cover portion 31 which is likewise carried and supported upon the inner surface of the main housing cover 27.

The main housing cover 27 is pivoted or hinged from the plane of the base of the housing 13 and permitted to rotate through a limited angle or arc about an axis of rotation represented at 33. The angle to which the cover portion 27 may open with respect to the housing 13 is limited and determined by the tape positioning and guiding components arranged to be included in the housing and later to be described herein.

While stated purely illustratively and for the purpose of setting forth one form of suitable shielding arrangement, the magnetic wiping or erasing head 15 may be contained within a shield formed solely of copper. The magnetic recording head may be contained within a shield element formed solely of mu-metal. And, lastly, the reproducing head, as is indicated particularly by Fig. 1, is preferably formed from a series of layers of various shielding materials. Illustratively the shield element 29 and its therewith-associated cover may be formed so that its inner surface is of mu-metal next to which is a layer of copper and on the outer surface of which is a second layer of mu-metal, all as represented by the outlines and sectioning shown in Fig. 1 particularly.

These various shields are adequate completely to shield the various magnetic heads from one another and to permit the operation desired. For convenience of illustration no connections of electrical nature have been shown for supplying operative currents or voltages to the magnetic heads. In fact, the magnetic heads themselves have not been shown in detail. The magnetic heads, however, are of well-known construction and it is believed that an illustration of construction would be confusing rather than helpful to the disclosure of the invention. However, as such components are customarily found in assemblies for the described purpose known as the Ampex type 300 recorder, for instance.

It was stated above that the shield elements for the magnetic heads 17 and 19 respectively were provided with cover portions that were carried by the housing cover proper. These cover portions, as are shown by Figs. 1, 2 and 3, are secured to a piece of spring or resilient metal 35. The spring strip 35 is secured at its end 37 to the cover member 27 so as to be movable therewith. The opposite end 39 of the spring member 35 rests against the inner surface of the housing cover 27. The spring-like member 35 is then fastened to the cover element of the shield, such as the element 25, at some point intermediate the fastening at its end 37 and its spring-pressed free end 39. Illustratively this fastening is shown at the point 41 which may be provided by suitable rivets or other convenient means. As the arrangement is illustrated the cover is thus positioned in substantially full floating fashion with respect to the housing cover 27 but with closure of the housing cover 27 by rotation thereof about the hinge or axis 33 the suitable cover or shield elements, such as 25 and 31, are brought to rest and tightly fit against the shields 23 and 29, for instance, surrounding the various magnetic head elements, at the same time that the cover element 27 closes upon the housing 13.

Under the circumstances the magnetic tape 11 which is positioned within the housing and which is arranged as shown by Fig. 1, for instance, to pass directly over the magnetic heads 15, 17 and 19 respectively, must pass through the complete magnetic head shield elements. To this end either one or both of the shields proper and its cover may be slotted or apertured to provide a tape ingress and a tape egress slot. In some instances it is desirable to provide openings or apertures in each of the shield proper and its associated cover at points opposite one another so that upon cover closure there will be two precisely alined apertures or openings from which the tape may pass. In other forms of arrangement the shield, for instance, may be slotted or apertured on one side to permit tape ingress and the tape egress may be through a slot in the cover only or in a slot or aperture in each of the cover and its associated shield. It is not important that the precise location of the apertures or openings through which the tape may pass be either in the housing or shield proper or cover but it is essential that the combined assembly be so arranged as to permit tape passage in the cover-closed position. In connection with the shield element 21 surrounding the magnetic head 15 which, for illustrative purposes was assumed as the wiping or erasing head, and the shield not having necessarily a cover to rest thereover, the shield itself usually is provided with a slot or opening as indicated at 42 in Fig. 1 through which the tape is suitably passed to the various magnetic heads.

In the operational position, the tape 11 enters the housing 13 by passing through a slot 43. Similarly, upon leaving the housing it passes through a second slot 45. This slot is shown generally only in Fig. 1, where the upper half in elevation has been omitted. It is, however, to be noted that the slots 43 and 45 formed by cutting away a portion of the forward edge of the housing, extend for a width which is slightly greater than that of the tape 11 and at an elevation therefrom corresponding substantially to the height of the tape-bearing surface 47, forming a part of the bearing members 47 and 49.

The lower edge 51 of the tape 11 thus rests upon the entrance bearing 47 intermediate the edge of the housing 13 and the shield element 21, and also upon the bearing member 47 intermediate the opposite edge of the housing 13 and the shield element 29.

In order that the tape 11 may be positioned as above described and brought to rest upon the bearing members 47 and upon the various magnetic heads, it must first have been suitably located and positioned upon tape holding and locating components carried by the cover 27. This tape location occurs with the cover 27 in its open position. As can be seen from reference to Fig. 2, tape holding plate 53 having a curvature 55, which is generally concentric with the axis or hinge 33 upon which the cover rotates, is arranged to provide the support initially to locate the tape. While the curvature of the arced or sector-shaped tape support plate 53 may vary within reasonable limits it is such that the tape brought to rest thereupon in the cover-open position is caused to slide upon cover closure in such a way as to fit or position itself immediately upon the support-bearing surfaces 47 at opposite ends of the housing. Thus, the bearing surfaces 47 are located at substantially the same distance from the housing base as is the length of the radius of curvature of the curved or sector-shaped plate 53 from the axis of rotation of the cover member 27.

The curved or sector-shaped support members 53 form tape receiving brackets in the cover-open position. These brackets support the ends of the tape contained within the housing proper. The magnetic tape is generally flexible and not particularly rigid. It is therefore desirable to support the tape in the cover-open position at points intermediate the curved or sector-shaped plates or tape support brackets. To this end, there is also carried upon the cover member 27 a pair of brackets 57 which are arranged to rotate therewith. The brackets 57 have a flattened surface 59 which limits the tape position intermediate the cover 27 and the housing proper 13. Carried upon these brackets 57 are bearing surfaces 61 of a height slightly greater than the tape width. These bearing surfaces are arranged in the cover-open position in a plane at approximately 90° to the tape support and locating bearing surfaces 47 and 49, where they form tape guide or bearing surfaces. The bearings 61 may be constructed similarly to the bearings 47 and 49, and thus may be quartz, Pyrex or other forms of glass rods or sapphire elements, or they may be formed from any hard, substantially anti-friction, bearing surface desired. The bracket 57 is slightly recessed, as indicated at 63, in order to support these bearing elements 61. The bearing surface pins 61 are tightly secured therein. Cover motion between an open and closed state is then limited by the bearing support bracket element 57 coming to rest against a suitable stop provided by a housing spacing element 65, as shown particularly by Figs. 1 and 3. The housing spacing elements 65 divide the housing into its several sections and form recesses or chambers into which the various magnetic head assemblies are located. In the cover-closed position the bearing support plates 57 which, as above stated, are secured to the housing cover, pivot or rotate about a center corresponding to the hinge axis 33, and thus move with cover closure to a position to the rear of the shield elements surrounding the various magnetic heads, which position is more clearly shown by Fig. 1.

As the recessed position of the brackets is reached with cover closure the magnetic tape 11 is released from its support by the arcuate or sector-shaped plates and the bearing surfaces 61 and slips by gravitational force acting in addition to the force of motion derived from cover closure into the support provided by the bearings 47. In this position it is then caused also to rest upon the magnetic heads 15, 17 and 19 respectively. Simultaneously the tape is passed through the slots or apertures provided in either the shields or the shield covers or both surrounding the magnetic heads.

It is important that the tape in its guided position as it passes over the bearing surfaces 47 shall be accurately positioned with respect to the magnetic heads. The tape is tensioned in its directional travel by means of the pull exerted thereupon by the tape pull or drive mechanism. Its location relative to the magnetic head elements is determined by the height of the bearing members 47 and 49 from the housing base. To this end these bearing members which, as above stated, may be glass, quartz or other forms of pins or sapphires having anti-friction bearing properties, are preferably held in support brackets at fixed separation one from another. The support brackets 67 may be secured either to the edges of the housing or to the shield elements, or upon separate brackets intermediate these two components. The brackets have provided therein two straight-edged surfaces 69 at fixed spacing from one another on which the bearing members 47 and 49 are permitted to rest. The other surface 71 serving to locate the bearing members 47 and 49 is sloped in such a way as to form somewhat of a trough to hold the support element. Thus as the diameter of the bearing member varies slightly it will fit further into the sloped side, but the space of the two members is precisely fixed and maintained. The adjusting screws 73 and suitable resilient spacing members 75 serve to tighten and tension the bearing components 47 and 49 so as to maintain precisely the desired fit therebetween.

Cover opening and closing may be effected in any manner desired, such as by the knob or handle 78. So that the housing cover shall be maintained tightly closed in the tape utilization position it is usually desirable to maintain it spring-pressed relative to the housing. This is done by means of suitable hinge springs (not shown) formed as a part of the hinge 33.

The foregoing description does not make specific reference to the mechanism to adjust the various magnetic heads in position with respect to the tape and to each other. The erase or wipe-off head is not at all critical in its adjustment. Essentially it is so supported within its individual shield or housing in such a way that the angle at which the tape approaches and leaves the head is established by the relationship of this head mounting to the tape ingress bearings and to the remaining heads. Adjustments for the record head and the reproduce or play-back head are, however, more critical. Not only must these heads be adjusted to establish the angle at which the tape approaches and leaves the heads, but the heads must also be positioned as close to parallelism with respect to each other as is possible. This is in order to obtain proper operation for the record and reproduce processes. Generally, it is desirable that the heads be so positioned that the gaps are maintained parallel to one another, as above noted, as well as perfectly transverse to the axis along which the tape is moving. In this connection, it may be noted that the precision required for this adjustment is such that if there is a variance of as much as 0.0003" in misadjustment from parallelism at one edge of the head gaps with respect to the opposite edge, a difference in response of as much as two decibels may be expected at an operating frequency of 15 kc.

To achieve this precision of adjustment the various magnetic heads are positioned with respect to the tape and with respect to each other in their support within the individual shield elements in substantially three-point suspension. Adjustment of the support elements (usually screws held aginst spring members) provides for shifting the heads in more than a single path in order to obtain the desired position relative to the axis along which the tape is moving, and also to obtain the substantially precise parallelism between the center-lines of the gap space of each of the heads.

Having now described my invention, what is claimed is:

1. A quick-loading magnetic head assembly comprising a support housing; an erasure head, a recorder head and a reproducer head relative to which a record tape strip is adapted to be positioned for utilization by contact with the respective heads, said heads being arranged substantially adjacent one another within the housing and having the tape-contacting portions thereof located relative to one another along a substantially arcuate path having a radius which is large relative to head separation; individual shield elements at least partially surrounding each of the heads contained within the housing, a hinged housing cover secured substantially at the plane of the housing base and connected to rotate through a limited arc to cover and close over all of the heads in its closed position against the housing and in its open position to give access to the respective heads, said shields having tape ingress and egress slots therein through which a record tape is adapted to move relative to each head on cover closure, a sector-shaped tape catcher supported upon each end of the hinged cover and having a curvature substantially concentric with the axis of the cover hinge and a radius substantially equal to the height of the shield slots relative to the housing base, said housing also having a slot at either end substantially adjacent the sector-shaped member and at a height from the base substantially coinciding with that of the slotted shield components, a pair of anti-friction tape-carrying bearing surfaces supported above and below each of the adjacently-positioned slotted elements of the shield and housing, and means provided by the sector-shaped plates for laterally shifting a record strip placed thereupon in the cover-open position so that with cover closure any so-supported record strip is transferred from the sector-shaped elements to the bearing members in a position such that its edge is supported and located between the bearings and so that the tape is simultaneously arcuately so shaped that it is passed through the should slots and its flattened surface contacts the shielded head members over a limited arc.

2. A quick-loading magnetic head assembly comprising a support housing; an erasure head, a recorder head and a reproducer head relative to which a record tape strip is adapted to be positioned for utilization by contact with the respective heads, said heads being arranged substantially adjacent one another within the housing and having the tape-contacting portions thereof located relative to one another along a substantially arcuate path having a radius which is large relative to head separation; individual shield elements at least partially surrounding each of the heads contained within the housing, a hinged housing cover secured substantially at the plane of the housing base and connected to rotate through a limited arc to close over all of the heads in its closed position against the housing and in its open position to give access to the respective heads, a shielding cover member for at least one of the individual head shield elements supported in generally full floating manner on the inner face of the housing cover and so positionally arranged on the cover that with the cover closure it forms a substantially complete closure element over the therewith-associated and alined shield and substantially completely shields the contained head, such shields and covers having tape ingress and egress slots therein through which a record tape is adapted to move relative to each head on cover closure, a sector-shaped tape catcher supported upon each end of the hinged cover and having a curvature substantially concentric with the axis of the cover hinge and a radius substantially equal to the height of the shield and cover slots relative to the housing base, said housing also having a slot at either end substantially adjacent the sector-shaped member and at a height from the base substantially coinciding with that of the slotted shield and cover components, a pair of anti-friction tape-carrying bearing surfaces supported above and below each of the adjacently-positioned slotted elements of the shield and housing, and means provided by the sector-shaped plates for laterally shifting a record strip placed thereupon in the cover-open position so that with cover closure any so-supported record strip is transferred from the sector-shaped elements to the bearing members in a position such that its edge is supported and located between the bearings and so that the tape is simultaneously arcuately so shaped that it is passed through the shield slots and its flattened surface contacts the shielded head members over a limited arc.

3. The assembly claimed in claim 1 comprising, in addition, a movable substantially anti-friction bearing surface supported intermediate adjacent faces of the shield elements, means in the cover-open position for moving the said bearing surface between the shield elements to a position such that a record tape member is forced away from the head members and toward the cover element and movable with cover closure to a position intermediate the shield elements such that contact between the bearing surface and the record tape is broken.

4. A quick-loading magnetic head assembly comprising a support housing having included therein an erasure head, a recorder head and a reproducer head arranged substantially adjacent one another and relative to each of which a record tape strip is adapted to be positioned for utilization by contacting the respective heads along said heads being located relative to one another along a substantially arcuate path having a radius which is large relative to head separation; individual shield elements partially surrounding each of the heads contained within the housing, a hinged housing cover connected to rotate through a limited arc substantially about the housing base and to cover and close over all of the heads in its closed position against the housing and in its open position to give access to the respective heads; a shield cover member for at least one of the shield elements supported in full floating manner on the inner face of the housing cover and so positionally arranged on the cover that with cover closure it forms a substantially complete closure element over the therewith-associated and alined shield, said head shielding assemblies being such as to permit a record tape strip to pass over and in contact with its therewith associated head, said housing having tape-passing slots at its opposite ends and in substantial alinement with the magnetic heads, a sector-shaped tape catcher supported upon each end of the cover and having a curvature substantially concentric with the cover hinge and a radius substantially equal to the height of the shield and cover slots relative to the housing base, said housing also having a slot at either end substantially adjacent the sector-shaped member and at a height from the base substantially coinciding with that of the slotted shield and cover components; a pair of adjustable anti-friction bearing surfaces supported above and below each of the slotted elements adjacent the housing slot and arranged to support the edge of a record tape, and means provided by the sector-shaped plates for laterally shifting a record strip placed thereupon in the cover-open position so that with cover closure any supported record strip is transferred in supported position from the sector-shaped element to the bearing members in such position that its edge is supported thereon and such that the tape is simultaneously arcuately shaped so that its flattened surface contacts the several head members.

5. A quick-loading magnetic head assembly comprising a support housing having included therein an erasure head, a recorder head and a reproducer head arranged substantially adjacent one another and relative to each of which a record tape strip is adapted to be positioned for utilization by contacting the respective heads, said heads being located relative to one another along a substantially arcuate path having a radius which is large relative to head separation; individual shield elements partially surrounding each of the heads contained within the housing, a hinged housing cover connected to rotate through a limited arc substantially about the housing base and to cover over all of the heads in its closed position against the housing and in its open position to give access to the respective heads; a shield cover member for at least one of the shield elements supported in full floating manner on the inner face of the housing cover and so positionally arranged on the cover that with cover closure it forms a substantially complete closure element over the therewith-associated and alined shield; said shield and cover elements collectively substantially completely housing at least one of the heads and having therein ingress slots and egress slots through which a record tape is adapted to move relative to each head on cover closure; a curved tape catcher element supported upon each end of the cover and having a curvature such that its radius at the innermost point is substantially equal to the height of the housing tape passing slots relative to the housing base; a pair of anti-friction bearing surfaces supported above and below the tape passing housing slots and arranged to support the edge of a record tape, and means provided by the curved plates for laterally shifting a record strip placed thereupon in the cover-open position so that with cover closure any supported record strip is transferred in supported position from the sector-shaped element to the bearing members in such position that its edge is supported thereon and such that the tape is simultaneously arcuately shaped so that its flattened surface contacts the several head members.

6. A quick-loading magnetic head assembly comprising a support housing having included therein an erasure head, a recorder head and a reproducer head arranged substantially adjacent one another and relative to each of which a record tape strip is adapted to be positioned for utilization by contacting the respective heads, said heads being located relative to one another along a substantially arcuate path having a radius which is large relative to head separation; individul shield elements partially surrounding each of the heads contained within the housing, a hinged housing cover connected to rotate through a limited arc substantially about the housing base and to cover and close over all of the heads in its closed position against the housing and in its open position to give access to the respective heads; a shield cover member for at least one of the shield elements supported in full floating manner on the inner face of the housing cover and so positionally arranged on the cover that with cover closure it forms a substantially complete closure element over the therewith-associated and alined shield; said shield and cover elements collectively substantially completely housing one of the heads and having therein ingress slots and egress slots through which a record tape is adapted to move relative to each head on cover closure; a sector-shaped tape catcher supported upon each end of the cover and having a curvature substantially concentric with the cover hinge and a radius substantially equal to the height of the shield and cover slots relative to the housing base, said housing also having a slot at either end substantially adjacent the sector-shaped member and at a height from the base substantially coinciding with that of the slotted shield and cover components; a pair of anti-friction bearing surfaces supported above and below each of the slotted elements adjacent the housing slot and arranged to support the edge of a record tape, and means provided by the sector-shaped plates for laterally shifting a record strip placed thereupon in the cover-open position so that with cover closure any supported record strip is transferred in supported position from the sector-shaped element to the bearing members in such position that its edge is supported thereon and such that the tape is simultaneously arcuately shaped so that its flattened surface contacts the several head members.

7. A quick-loading magnetic head assembly comprising a support housing; an erasure head, a recorder head and a reproducer head relative to which a record tape strip is adapted to be positioned for utilization by contact with the respective heads, said heads being arranged substantially adjacent one another within the housing and having the tape-contacting portions thereof located relative to one another along a substantially arcuate path, a hinged housing cover secured substantially at the plane of the housing base and connected to rotate through a limited arc to cover and close over all of the magnetic heads in its closed position against the housing and in its open position to give access to the respective heads, said housing having tape ingress and egress slots therein through which a record tape is adapted to move relative to each head on cover closure, a curved tape support positioned at each end of the hinged cover and having a curvature substantially concentric with the axis of the cover hinge and a radius substantially equal to the height of the housing slots relative to the housing base, a pair of anti-friction tape-carrying bearing surfaces supported above and below each of the housing slots, and means provided by the curved tape support plates for laterally shifting a record strip placed thereupon in the cover-open position so that with cover closure any so-supported record strip is transferred from the curved tape support elements to the bearing members in a position such that its edge is supported and located between the bearings and so that the tape is simultaneously arcuately shaped to pass through the housing slots and to have surface contact with the magnetic head members over a limited arc.

8. A quick-loading magnetic head assembly comprising a support housing; an erasure head, a recorder head and a reproducer head relative to which a record tape strip is adapted to be positioned for utilization by contact with the respective heads, said heads being arranged substantially adjacent one another within the housing and having the tape-contacting portions thereof located relative to one another along a substantially arcuate path, a hinged housing cover secured substantially at the plane of the housing base and connected to rotate through a limited arc to close over all of the heads in its closed position against the housing and in its open position to give access to the respective heads, said housing having a slot at either end for tape ingress and egress so that a record tape passed therethrough contacts each head on cover closure, a sector-shaped tape support located upon each end of the hinged cover, said support having a radius of curvature substantially equal to the height of the housing slots relative to the housing base, a pair of anti-friction tape-carrying bearing surfaces supported above and below each housing slot and positioned adjacent thereto, and means provided by the sector-shaped plates for laterally shifting a record strip placed thereupon in the cover-open position so that with cover closure any so supported record strip is transferred from the sector-shaped elements to the bearing members in a position such that its edge is supported and located between the bearings and so that the tape is passed through the housing slots and simultaneously arcuately so shaped that it contacts the magnetic head members over a limited arc.

9. The assembly claimed in claim 8 comprising, in addition, a movable substantially anti-friction bearing surface supported intermediate each of the heads, means in the cover-open position for moving the said bearing surface between the magnetic heads to a position such that a record tape member is forced away from the head members and toward the cover element and with movement of the cover to a position of closure the bearing surfaces move between the magnetic heads to release a supported tape for contact with the head members.

10. A magnetic head assembly comprising a support housing, an erasure head, a recorder head and a reproducer head relative to each of which a record tape strip is adapted to be positioned for utilization by contact with the respective heads, said heads being arranged substantially adjacent one another within the housing and having the tape-contacting portions thereof located relative to one another along a substantially arcuate path having a radius which is large relative to the separation of the several heads with respect to each other, individual shield elements at least partially enclosing each of the heads contained within the housing, a housing cover hinged substantially at the plane of the housing base and connected to rotate to cover and close over all of the heads in its closed position against the housing and in its open position to give access to the respective heads, said support housing having a slot at each end thereof at a height from the housing base substantially coinciding with the tape-contacting areas of the magnetic heads, a pair of anti-friction tape bearing surfaces supported at opposite edges of each of the end slots of the housing to form guide and bearing surfaces to located the record tape strip relative to the heads when the said strip is drawn through the housing in a substantially taut state.

11. A magnetic head assembly comprising a support housing, an erasure head, a recorder head and a reproducer head relative to each of which a record tape strip is adapted to be positioned for utilization by contact with the respective heads, said heads being arranged substantially adjacent one another within the housing and aligned at an angle relative to each other so that the tape-contacting portions thereof are located relative to one another along a substantially arcuate path whose radius which is large relative to the separation of the several heads with respect to each other, individual shield elements at least partially surrounding each of the heads contained within the housing, a housing cover hinged to rotate about an axis substantially at the plane of the housing base so that in its closed position against the housing it is closed over all of the heads and in its open position provides access to the respective heads, said support housing having a slot at each end thereof at a height from the housing base substantially coinciding with the tape contacting areas of the magnetic heads, and anti-friction tape bearing surfaces supported at opposite edges of each of the end slots of the housing to form guide and bearing surfaces to locate the record tape strip relative to the heads when the said strip is drawn through the housing in a substantially taut state.

12. A magnetic head assembly comprising a support housing, magnetic erasure, recorder and reproducer heads located in the housing in such position relative to each other that a record tape strip is adapted to be positioned for utilization by contact with the respective heads, said heads being arranged at an angle to each other and substantially adjacent one another within the housing and having a tape-contacting arc of the order of 8°, the said heads being located relative to one another along a generally arcuate path whose radius is large relative to the separation of the several heads with respect to each other, individual shield elements at least partially enclosing each of the heads contained within the housing, a housing cover hinged to rotate about an axis substantially at the plane of the housing base so that in its closed position against the housing it closes over all of the heads and in its open position provides access to the respective heads, said shield elements having tape ingress and egress slots therein through which a record tape strip is adapted to move relative to the housing-contained head, said support housing also having a slot at each end thereof at a height from the base substantially coinciding with that of the slotted shield components and the tape-contacting areas of the magnetic heads, and anti-friction tape bearing surfaces supported at opposite edges of each of the end slots of the housing to form guide and bearing surfaces to locate the record tape strip relative to the heads when the said strip is drawn through the housing in a generally taut state.

13. A magnetic head assembly comprising a support housing having included therein an erasure head, a recorder head and a reproducer head arranged substantially adjacent one another and relative to each of which a record tape strip is adapted to be positioned for utilization by contacting the respective heads, said heads being located relative to one another along a substantially arcuate path having a radius which is large relative to head separation; individual shield elements at least partially enclosing each of the heads contained within the housing, a hinged housing cover connected to rotate about an axis located substantially at the housing base so as to close over all of the heads in its closed position against the housing and in its open position to give access to the respective heads; a shield cover member for at least one of the shield elements supported on the inner face of the housing cover and so positionally arranged on the cover member that with cover closure it forms a substantially complete closure element over one of the elements surrounding one of the heads, said shielding assemblies for the individual heads being such as to permit a record tape strip to pass over and in contact with its therewith-associated head, said shield assemblies having at least one tape-passing slot in substantial alignment with the therein contained magnet head, said housing also having a slot at either end at locations relative to the base substantially coinciding with that of the slotted shield and cover components; and an anti-friction bearing surface supported at opposite edges of the end slotted portions of the housing to guide the edges of a record tape when said tape is drawn through the housing.

14. A magnetic head assembly comprising a support housing having included therein an erasure head, a recorder head and a reproducer head arranged substantially adjacent one another and at an angle relative to each and adjacent which a record tape strip is adapted to be positioned for utilization by contacting the respective heads, said heads being located relative to one another along a substantially arcuate path whose radius is large relative to head separation; individual shield elements at least partially enclosing each of the heads contained within the housing, a hinged housing cover connected to rotate about an axis located substantially at the housing base so as to close over all of the heads in its closed position against the housing and in its open position to give access to the respective heads; a shield cover member for at least one of the shield elements resiliently supported on the inner face of the housing cover to press against one of the head shield elements to form a substantially complete closure element about the said element, said shielding assemblies for the individual heads being such as to permit a record tape strip to be drawn through the housing and to pass in contact with its therewith-associated head, said shield assemblies having at least one tape-passing slot in substantial alignment with the therein contained magnet head, said head housing also having a slot at either end at locations relative to the base substantially coinciding with that of the slotted shield and cover components; and an anti-friction bearing surface supported at opposite edges of the end slotted portions of the housing to guide the edges of a record tape when said tape is drawn through the housing.

15. A magnetic head assembly comprising a support housing, an erasure head, a recorder head and a reproducer head relative to each of which a record tape strip is adapted to be positioned for utilization by contact with the respective heads, said heads being arranged substantially adjacent one another within the housing and having the tape-contacting portions thereof located relative to one another along a substantially arcuate path having a radius which is large relative to the separation of the several heads with respect to each other, individual shield elements at least partially enclosing each of the heads contained within the housing, a housing cover hinged substantially at the plane of the housing base and connected to rotate to cover and close over all of the heads in its closed position against the housing and in its open position to give access to the respective heads, said support housing having means including a slot at each end thereof at a height from the housing base substantially coinciding with the tape-contacting areas of the magnetic heads to locate the record tape strip relative to the heads when the said strip is drawn through the housing in a substantially taut state.

16. The assembly claimed in claim 15 comprising, in addition, a movable substantially anti-friction bearing surface supported intermediate each of the heads, means for moving the said bearing surface between the magnetic heads to a position such that a record tape member is forced away from the head members and toward the cover element, the bearing surfaces being movable between the magnetic heads to release and move a supported tape from contact with the head members.

HAROLD W. LINDSAY.

No references cited.

Certificate of Correction

Patent No. 2,563,850

August 14, 1951

HAROLD W. LINDSAY

It is hereby certified that error appears in the printed specification of the above numbered patent requiring correction as follows:

Column 10, line 34, for "aginst" read *against*; column 11, line 12, for "should" read *shield*; column 13, line 39, for "individul" read *individual*; column 15, line 41, for "located" read *locate*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*